United States Patent Office 3,674,458
Patented July 4, 1972

3,674,458
METHOD FOR REGULATING PLANT GROWTH
Robert I. Schattner, 4000 Masachusetts Ave. NW.,
Washington, D.C. 20016
No Drawing. Filed Jan. 28, 1969, Ser. No. 794,800
Int. Cl. A01n 21/02
U.S. Cl. 71—77                                    6 Claims

ABSTRACT OF THE DISCLOSURE

A method of regulating the growth of plants involving the treating of the seeds with an aqueous solution comprising sodium phenolate, sodium tetraborate, phenol and a humectant, before planting.

FIELD OF THE INVENTION

This invention relates to treating the seeds of autotrophic spermatophyte plants so that the plants will be more vigorous than like or similar plants grown from untreated seeds. The treatment according to the present invention not only stimulates and improves plant growth but protects the treated seeds against fungi, bacteria and yeast during storage.

SUMMARY OF THE INVENTION

In accordance with the present invention, it has been determined that this formulation applied directly to seeds of autotrophic spermatophyte plants promotes mitosis, elongation and differentiation, with a resultant increase in rate of flowering and in the size of the growing and mature plants.

This treatment protects the seeds from fungal attack during normal storage and after the seeds are planted, they exhibit improved growth characteristics.

This invention involves a novel method for improving the growth of plants by moistening the seeds with an aqueous solution of sodium phenolate, sodium tetraborate, phenol and a humectant.

It is another important object of the present invention to provide a novel method of stimulating the growth and vigor of plants comprising wetting the plant seeds with an aqueous solution of sodium phenolate, sodium tetraborate, glycerine, phenol and sodium-n-dodecylbenzene sulfonate.

It is a primary object of the present invention to provide seeds which are resistant to fungi, bacteria and yeast during storage and which exhibit improved growth properties when planted.

These and other important objects and advantages of the present invention will become more apparent in connection with the ensuing description and appended claims.

Numerous studies have indicated that the practice of this invention is effective to substantially inhibit and/or stop the growth of bacteria, mildew and yeast on seeds prior to planting. Moreover, chloroplast content of plants is substantially increased, and the vascular elements are increased in number.

The overall dimensions of growing plants originating from seeds treated in accordance with this invention is increased in comparison to those grown from untreated seeds.

Still further, the use of the solution hereof in treating seeds substantially shortens the period betwen planting and flowering, that is, it accelerates the growth and vigor of the plants.

DESCRIPTION OF THE PREFERRED EMBODIMENTS

The formulations employed in the practice of the present invention are aqueous solutions of combinations of ingredients having the following compositions:

Ingredient:

|  | Approx. percent by weight |
|---|---|
| Sodium phenolate | Up to about 15. |
| Sodium tetraborate U.S.P. | Up to about 5.5. |
| Glycerine U.S.P. | Up to about 15. |
| Phenol U.S.P. | Up to about 16.5. |
| Water | Balance. |

Other humetcants may be used in place of glycerine or the humectants may be omitted. The pH of the solution is preferably maintained at about 8.5 to 8.7.

Preferably, the upper and lower limits of the ingredients of the above-identified composition are as follows:

Ingredient:

|  | Approx. percent by weight |
|---|---|
| Sodium phenolate | 0.1–15 |
| Sodium tetraborate U.S.P. | 0.3–5.5 |
| Glycerine U.S.P. | 0.8–15 |
| Phenol U.S.P. | 0.1–16.5 |
| Water | Balance |

The foregoing formulation may be used in connection with autotrophic spermatophyte plants. Once again, the incorporation of glycerine as the humetcant is not critical, and others may be substituted if desired, such as ethylene glycol, propylene glycol, and the like.

According to the invention, the seeds of autotrophic spermatophyte plants (examples of which are corn, wheat, rice, rye, soybeans, tomatoes, etc.) are treated with the solution by soaking, spraying, fogging, or other available methods.

When treated and stored in the usual way, the seeds are resistant to attack by fungi, bacteria and yeast. When the treated seeds are planted, whether immediately after treatment or after treatment and storage, the plants are sturdier and more vigorous and the flowing occurs sooner.

To improve the effectiveness of the treatment of the spermatophyte plants, the formulation should preferably contain an anionic surfactant such, for example, as sodium-n-dodecylbenzene sulfonate. This particular surfactant does not adversely affect the activity of the solution. While the amount of the surfactant employed is not critical, excellent results are obtained when the weight ratio of surfactant to the phenol is approximately 1–2:1.

It has been found that when any one or more of the components (except the humectant or the surfactant) is omitted from the solution, the seeds do not exhibit the same described properties of resistance to fungal, bacterial and yeast attack during storage or the described improved growth characteristics after planting. It has also been found that application of the solution directly to the soil or directly to the growthing plant does not substantially accelerate growth or flowering.

Examples 1 and 2 illustrate formulations of the present invention used as regulators of the growth of autotropic spermatophyte plants.

EXAMPLE I

A packet of tomato seeds was opened and divided into two parts. The first group of seeds was left untreated, while the second group of seeds was sprayed with an aqueous solution of the following composition:

| Ingredient: | Percent by weight |
| --- | --- |
| Sodium phenolate | 0.24 |
| Sodium tetraborate U.S.P. | 0.47 |
| Glycerine U.S.P. | 1.26 |
| Phenol | 1.41 |
| Sodium-n-dodecylbenzene sulfonate | 1.41 |
| Water—balance. | |

Both sets of seeds were then stored under normal ambient air conditions for a period of approximately four months. Following the four month storage period, both sets of seeds were planted using the same soil and under the same moisture, temperature, light and handling conditions.

Microscopic examination demonstrated wild fungal spores were present on the untreated seeds, while no molds were noted on the treated seeds.

Inoculation of untreated seeds with spores of *Aspergillus niger*, *Penicillium sp.*, and *Chaetomium globosum* resulted in infection of the seeds with these organisms. Inoculation of treated seeds with the same spores resulted in no infection after a four month period.

Studies of the fungicidal activity of the composition were preformed according to the form suggested by the "Manual of Agricultural Chemists," 19th ed., 1967. Seeds treated with the composition of Example 1 were contaminated with *Aspergillis niger*, *Chaetomium globosum* and *Penicillium sp.* and were incubated at 37° C. for 21 days, and no growth of fungi was observed.

EXAMPLE II

The composition of Example I was applied to two groups of *Phaeseolous vulgaris* plants (Kentucky wonder beans) which were subjected to the same treatment as in Example I above. The results of this treatment demonstrated increased vigor in the plants from treated seeds, as shown in Table I:

TABLE I

|  | Average measurements of plants from seeds treated with solution of this invention, in. | Average measurements of plants from untreated seeds (control), in. |
| --- | --- | --- |
| Root growth | 1 | ½ |
| Stalk growth | 11-½ | 8-½ |
| Stem diameter | ½ | ¼ |
| Leaf size (apex to base) | 3-½ | 2-¼ |

The comparison of the sizes of the treated and untreated seeds was made by microscopic and macroscopic observations.

Microscopic observations from Example II (1) The vascular elements of seedlings from seeds treated with the solution of this invention are increased.

(2) The chloroplast content of the plants from treated seeds is consistently and substantially greater than that of plants from untreated seeds in the control group.

Macroscopic observations from Example II (1) The flowering of plants from the treated seeds begins sooner than plants in the untreated control group.

(2) It was observed that plants from seeds treated with the composition of this invention possess much greater vigor than plants from untreated seeds.

The two groups of *Phaeseolus vulgaris* seeds mentioned above were assembled. One group was treated with the composition of Example I, while an equal aliquot was untreated and used as a control and planted at the same time. After a 28 day period, the following measurements were made:

TABLE II
Beans (*Phaeseolus vulgaris*

|  | Length of stem cm. | Root, cm. | Stem diam., cm., |
| --- | --- | --- | --- |
| Treated | 12.0 | 12.3 | 1.3 |
| Control | 7.0 | 8.5 | 0.7 |

Cytological data

Thickness of outer layer (epidermal and cortical):
 Treated—6.7 cm.
 Control—3.5 cm.
Aleurone layer thickness:
 Treated—1.1 cm.
 Control—0.3 cm.
Metaxylem vessels:
 Treated—46 vessels
 Control—18 vessels As seen in Table II, the group treated with the composition of Example II was significantly stimulated insofar as growth was concerned compared to the control group.

It has further been found that the growth stimulation takes place only when the seeds are treated with the solution prior to planting. When the solution is applied to the plant foliage of autotrophic spermatophyte plants, or to the soil in which said such plants are growing, there was no noticeable growth stimulation.

EXAMPLE III

Various seeds of the *Phaeseolus vulgaris* family (illustratively, beans) were divided into four groups of each. The first group was subjected to contamination by sulfur dioxide (a recognized air contaminate) applied in a specially built chamber. The second group of seeds was also treated with sulfur dioxide in the same manner. This second group of seeds was then treated with a solution of this invention as in Example I. A third group was treated with the solution of Example I without first exposing it to the contaminate; and a fourth group, a control group, consisted of untreated seeds not exposed to either the sulfur dioxide or to the solution. The four groups were then planted under identical conditions in the same soil.

The group treated with the sulfur dioxide showed sparse and retraded growth as compared to the control group.

The group treated with sulfur dioxide and the solution of Example I exhibited an initial period of growth retardation and subsequent increased vigor as compared with the control group. It was interesting to note that while this group evidenced eventually more vigorous growth than the control group, it was less dense than the control group showing reduced seed germination. Initial retardation of vigor was therefore overcome by the solution in the surviving seeds.

The third group which was treated with the Example I solution was characterized as in Example II above. The vigor was substantially improved over that of the control group.

It is apparent that the present invention will increase food supplies through stimulated crop vigor. Moreover, it will retain the viability of the seeds and minimize the danger of destruction from bacteria, fungal, mildew and yeast attack.

I claim:

1. A method of stimulating the growth of autotrophic sphermatophyte plants comprising moistening the seeds of plants whose growth is stimulated thereby planting with an aqueous solution comprising on a percent by weight basis:

| | Percent |
|---|---|
| Sodium phenolate | 0.1–15 |
| Sodium tetraborate | 0.3–5.5 |
| Phenol | 0.1–16.5 |

2. The method defined in claim 1 wherein: the solution contains up to 15% humectant.

3. The method of claim 2 in which: the humectant is glycerine.

4. The method defined in claim 1 wherein: the solution contains sodium-n-dodecylbenzene sulfonate.

5. The method defined in claim 4 wherein: the weight ratio of said sulfonate to the phenol in said solution is approximately 1–2:1.

6. The method defined in claim 1 wherein the solution comprises on a weight basis: 0.24% sodium phenolate, 0.47% sodium tetraborate and 1.41% by phenol.

References Cited

UNITED STATES PATENTS

| | | | |
|---|---|---|---|
| 1,618,370 | 2/1927 | Engelmann et al. | 47—57.6 |
| 1,950,701 | 3/1934 | Epangenberg | 71—77 |
| 2,321,736 | 6/1943 | Du Puis et al. | 71—77 |
| 2,502,809 | 4/1950 | Vogelsang | 47—57.6 |
| 3,199,971 | 8/1965 | Shimazaki | 71—77 |
| 3,317,376 | 5/1967 | Schattner | 424—346 |
| 3,421,882 | 1/1969 | Ordas | 71—100 |

FOREIGN PATENTS

| | | | |
|---|---|---|---|
| 11,724 | 5/1905 | Great Britain | 47—57.6 |
| 713,532 | 7/1965 | Canada | 424—346 |

LEWIS GOTTS, Primary Examiner

G. HOLLRAH, Assistant Examiner

U.S. Cl. X.R.

47—57.6; 71—80; 424—148, 346